(12) United States Patent
Kim

(10) Patent No.: US 9,357,414 B2
(45) Date of Patent: May 31, 2016

(54) APPARATUS AND METHOD FOR INTER-RAT MEASUREMENT IN A MULTI MODE TERMINAL STATION

(75) Inventor: Hye-Jeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 700 days.

(21) Appl. No.: 12/653,250

(22) Filed: Dec. 10, 2009

(65) Prior Publication Data

US 2010/0142487 A1    Jun. 10, 2010

(30) Foreign Application Priority Data

Dec. 10, 2008  (KR) .......................... 10-2008-0124999

(51) Int. Cl.
H01Q 11/12 (2006.01)
H04B 1/04 (2006.01)
(Continued)

(52) U.S. Cl.
CPC .................................... *H04W 24/10* (2013.01)

(58) Field of Classification Search
CPC . H04W 48/16; H04W 48/18; H04W 52/0206; H04W 52/0216; H04W 52/0229; H04W 52/0235; H04W 52/0251; H04W 56/00; H04W 72/1278; H04W 88/02; H04W 88/06; H04W 16/14; H04W 36/0088; H04W 52/02; H04W 52/0225; H04W 52/288; H04W 56/001; H04W 72/0446; H04W 36/0072; H04W 36/14; H04W 36/24; H04W 36/30; H04B 1/005; H04B 1/16; H04B 1/0064; H04B 1/406; H04B 7/082; H04B 7/2678; H04B 7/18563; H04B 1/0458; H04B 17/309; H04B 17/382; H04B 1/0406; H04M 1/73519; H04M 2207/20; H04M 1/72519; H04M 1/72522; H03F 1/56; H04L 41/046; H04L 41/5048

USPC .......... 455/15, 40, 49.1, 73, 77, 127.3, 127.4, 455/343.2, 412.1, 418, 432.1–433, 450, 455/552.1, 553.1, 554.1, 554.2, 556.1, 502, 455/509, 550.1, 5, 52.1, 561; 340/407.1; 370/252, 276–281, 310, 331, 332, 338, 370/462; 375/260, 219, 347; 379/39
See application file for complete search history.

(56) References Cited

U.S. PATENT DOCUMENTS 4,638,321 A * 1/1987 Drogin .......................... 342/444
5,640,679 A * 6/1997 Lundqvist et al. ............ 455/525
(Continued)

OTHER PUBLICATIONS

Notice of Preliminary Rejection dated Sep. 23, 2014 in connection with Korean Patent Application No. 10-2008-0124999; 11 pages.
(Continued)

*Primary Examiner* — Yuwen Pan
*Assistant Examiner* — Paul P Tran

(57) ABSTRACT

A mobile terminal includes an apparatus configured to perform a method for inter-Radio Access Technology (RAT) measurement. When a measurement condition is satisfied, the apparatus turns on, at an operating module, a standby module and generates a time latch signal to the standby module at a time T0. The apparatus also latches, at the standby module, a time according to the time latch signal and reports the latched time value to the operating module. At the operating module, a measurement request message is sent. The measurement request message includes measurement parameter information and offset information between the time T0 and antenna switching times T2 and T5 to the standby module. The apparatus sets, at the standby module, a time interrupt using the information of the measurement message and performing inter-RAT measurement according to the time interrupt.

20 Claims, 12 Drawing Sheets

(51) Int. Cl.

| | |
|---|---|
| *H04M 1/00* | (2006.01) |
| *H04B 1/38* | (2015.01) |
| *G08C 17/00* | (2006.01) |
| *H04W 4/00* | (2009.01) |
| *H04L 7/00* | (2006.01) |
| *H04W 24/10* | (2009.01) |

(56) References Cited

U.S. PATENT DOCUMENTS

| | | | | |
|---|---|---|---|---|
| 6,134,440 | A * | 10/2000 | Black | 455/436 |
| 6,741,836 | B2 * | 5/2004 | Lee et al. | 455/41.2 |
| 7,689,246 | B2 | 3/2010 | Herczog et al. | |
| 7,917,113 | B2 | 3/2011 | Palenius et al. | |
| 2006/0009216 | A1 * | 1/2006 | Welnick | H04W 48/16 |
| | | | | 455/434 |
| 2006/0111141 | A1 * | 5/2006 | Smith et al. | 455/553.1 |
| 2007/0037594 | A1 * | 2/2007 | Palenius et al. | 455/502 |
| 2007/0177546 | A1 * | 8/2007 | Lee | H04W 36/0066 |
| | | | | 370/331 |
| 2007/0183383 | A1 * | 8/2007 | Bitran | H04W 88/06 |
| | | | | 370/338 |
| 2007/0197204 | A1 * | 8/2007 | Herczog et al. | 455/422.1 |
| 2007/0275746 | A1 * | 11/2007 | Bitran | 455/509 |
| 2008/0207230 | A1 * | 8/2008 | Jung et al. | 455/458 |
| 2009/0034469 | A1 * | 2/2009 | Kim | 370/331 |
| 2009/0275355 | A1 * | 11/2009 | Tan et al. | 455/522 |
| 2009/0279517 | A1 * | 11/2009 | Chin et al. | 370/338 |
| 2010/0202379 | A1 * | 8/2010 | Luo et al. | 370/329 |
| 2010/0267410 | A1 * | 10/2010 | Chin et al. | 455/515 |

OTHER PUBLICATIONS

Notice of Final Rejection dated Mar. 22, 2015 in connection with Korean Patent Application No. 10-2008-0124999; 7 pages.

Intellectual Property Tribunal 8th Divsion Trial Decision dated Feb. 29, 2016 in connection with Korean Patent Application No. 2008-124999; 20 pages.

\* cited by examiner

APPARATUS AND METHOD FOR INTER-RAT MEASUREMENT IN A MULTI MODE TERMINAL STATION

CROSS-REFERENCE TO RELATED APPLICATION(S) AND CLAIM OF PRIORITY

The present application is related to and claims the benefit under 35 U.S.C. §119 to an application filed in the Korean Intellectual Property Office on Dec. 10, 2008 and assigned Serial No. 10-2008-0124999, the contents of which is incorporated herein by reference.

TECHNICAL FIELD OF THE INVENTION

The present invention relates generally to an apparatus and a method for handover of a multimode terminal station using multiple basebands in a communication system; and more particularly, to an apparatus and a method for inter-Radio Access Technology (RAT) measurement for handover of the multimode terminal station.

BACKGROUND OF THE INVENTION

Universal Mobile Telecommunication System (UMTS) system, which is based on Global System for Mobile communications (GSM) and General Packet Radio Services (GPRS) of European mobile communication systems, is a third generation asynchronous mobile communication system adopting wideband Code Division Multiple Access (CDMA). The $3^{rd}$ Generation Partnership Project (3GPP) developing the UMTS standardization is discussing Long Term Evolution (LTE) system as the next-generation mobile communication system of the UMTS system. Aiming at commercialization in about 2010, the LTE plans to support the high-speed packet based communication at the transmission rate of 100 Mbps at maximum. For the LTE system, a method for decreasing the number of nodes in the communication channel by simplifying the network configuration or a method for approaching the wireless protocol to the radio channel at maximum is under discussion.

As such, the communication systems are evolving to service the higher speed data or addressing issues in the implementation by modifying the standard. In this evolution, various systems can coexist in the same region according to compatibility level with the existing systems. For example, a new system (such as the LTE system) evolved from the existing system can be installed in a region where the legacy system such as GSM/GPRS/Enhanced Data rates for GSM Evolution (EDGE) (also referred to as an EDGE system) or UMTS/High Speed Packet Access (HSPA) (also referred to as a HSPA system) resides. Also, in the evolution, multimode terminals supporting various Radio Access Technologies (RATs) are introduced.

When communicating within one system, the multimode terminal measures a signal strength of another system for its seamless handover. In order to do so, the standard defines a GAP for the inter-RAT measurement.

Meanwhile, the multimode terminal drives a chipset, which does not operate for the power saving, in a power saving mode, or turns off the chipset. For example, in the LTE mode, the terminal can turn off the HEDGE baseband and the RF chipset. However, for the inter-RAT measurement, the terminal should turn on the corresponding chipset if it needs to and measure another system. When the chipset is turned off, the previous timing information is not preserved. Therefore, the EDGE system requiring the accurate timing information cannot carry out the measurement by itself. Further, since the chipset in the power-off state cannot acquire the accurate GAP location, the start point for the measurement is unknown.

As discussed above, for the multimode terminal supporting the various RATs, a method for error-free or reliable inter-RAT measurement is sought.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and a method for inter-Radio Access Technology (RAT) measurement in a multimode terminal which supports various RATs.

Another aspect of the present invention is to provide an apparatus and a method for supporting inter-RAT handover in a multimode terminal that supports various RATs.

Yet another aspect of the present invention is to provide an apparatus and a method for interfacing for inter-RAT measurement between chipsets that support different RATs in a multimode terminal supporting various RATs.

Still another aspect of the present invention is to provide an apparatus and a method for inter-RAT measurement by turning on a chipset on standby at an accurate GAP time in a multimode terminal which supports various RATs.

According to one aspect of the present invention, an apparatus of a multimode terminal includes a plurality of modules for supporting at least two RATs. Each module includes a multimode controller that controls inter-RAT measurement; a time generator that generates a reference time; a time latch controller that generates a time latch signal to a standby module at a particular time upon command from the multimode controller, latches a time according to a time latch signal from an operating module, and reports the latched time to the multimode controller; an interrupt generator that generates a time interrupt for the inter-RAT measurement according to setting of the multimode controller; and a modem that performs the inter-RAT measurement according to the time interrupt and provides the measurement result to the multimode controller.

According to another aspect of the present invention, an operating method of a multihop terminal that supports at least two RATs includes, when a measurement condition is satisfied, turning on, at an operating module, a standby module and generating a time latch signal to the standby module at a time T0; latching, at the standby module, a time according to the time latch signal and reporting the latched time value to the operating module; sending, at the operating module, a measurement request message comprising measurement parameter information and offset information between the time T0 and antenna switching times T2 and T5 to the standby module; and setting, at the standby module, a time interrupt using the information of the measurement message and performing inter-RAT measurement according to the time interrupt.

According to yet another aspect of the present invention, an operating method of a multihop terminal that supports at least two RATs includes when a measurement condition is satisfied, turning on, at an operating module, a standby module; calculating, at the operating module, offset values of antenna switching times T2 and T5 based on a time T0 and sending a measurement request message comprising measurement parameter information and offset information of the time T0 and the antenna switching times T2 and T5 to the standby module; generating, at the operating module, a trigger signal to the standby module at the time T0; and setting, at the standby module, a time interrupt using a reception time of the trigger signal and the information of the measurement request message and performing inter-RAT measurement according to the time interrupt.

According to still another aspect of the present invention, an apparatus that supports at least two RATs at a multimode terminal includes a first trigger generator that generates a time latch signal to a standby module at a time T0 when the standby module is turned on; a second time latch controller that latches a time according to the time latch signal and reports the latched time value to an operating module; a first dual mode controller that sends a measurement request message comprising measurement parameter information and offset information of the time T0 and antenna switching times T2 and T5 to the standby module; and a second dual mode controller that sets a time interrupt using information of the measurement message and performing inter-RAT measurement according to the time interrupt.

According to a further aspect of the present invention, an apparatus that supports at least two RATs at a multimode terminal includes a first dual mode controller that turns on a standby module when a measurement condition is satisfied, calculates offset values of antenna switching times T2 and T5 based on a time T0, and sends a measurement request message comprising measurement parameter information and offset information of the time T0 and the antenna switching times T2 and T5 to the standby module; a trigger signal generator that generates a trigger signal to the standby module at the time T0; and a second dual mode controller that sets a time interrupt using a reception time of the trigger signal and the information of the measurement request message and performing inter-RAT measurement according to the time interrupt.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments the present invention will become more apparent from the following detailed description taken in conjunction with the accompanying drawings, in which.

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terminologies described below are defined with consideration of functions in the present invention, and can change depending on the intention or practice of a user or operator. Therefore, the definitions should be determined on the basis of the descriptions over the specification.

Exemplary embodiments of the present invention provide a solution for inter-Radio Access Technology (RAT) measurement for the handover in a multimode terminal that supports various RATs.

Henceforth, a multimode terminal capable of accessing Long Term Evolution (LTE) system, Global System for Mobile communications (GSM) /General Packet Radio Services (GPRS)/Enhanced Data rates for GSM Evolution (EDGE) (also referred to as an EDGE system) or Universal Mobile Telecommunication System (UMTS)/High Speed Packet Access (HSPA) (also referred to as a HSPA system) is explained by way of example. However, the present invention is applicable to the terminal which supports other RATs.

Figure 1:
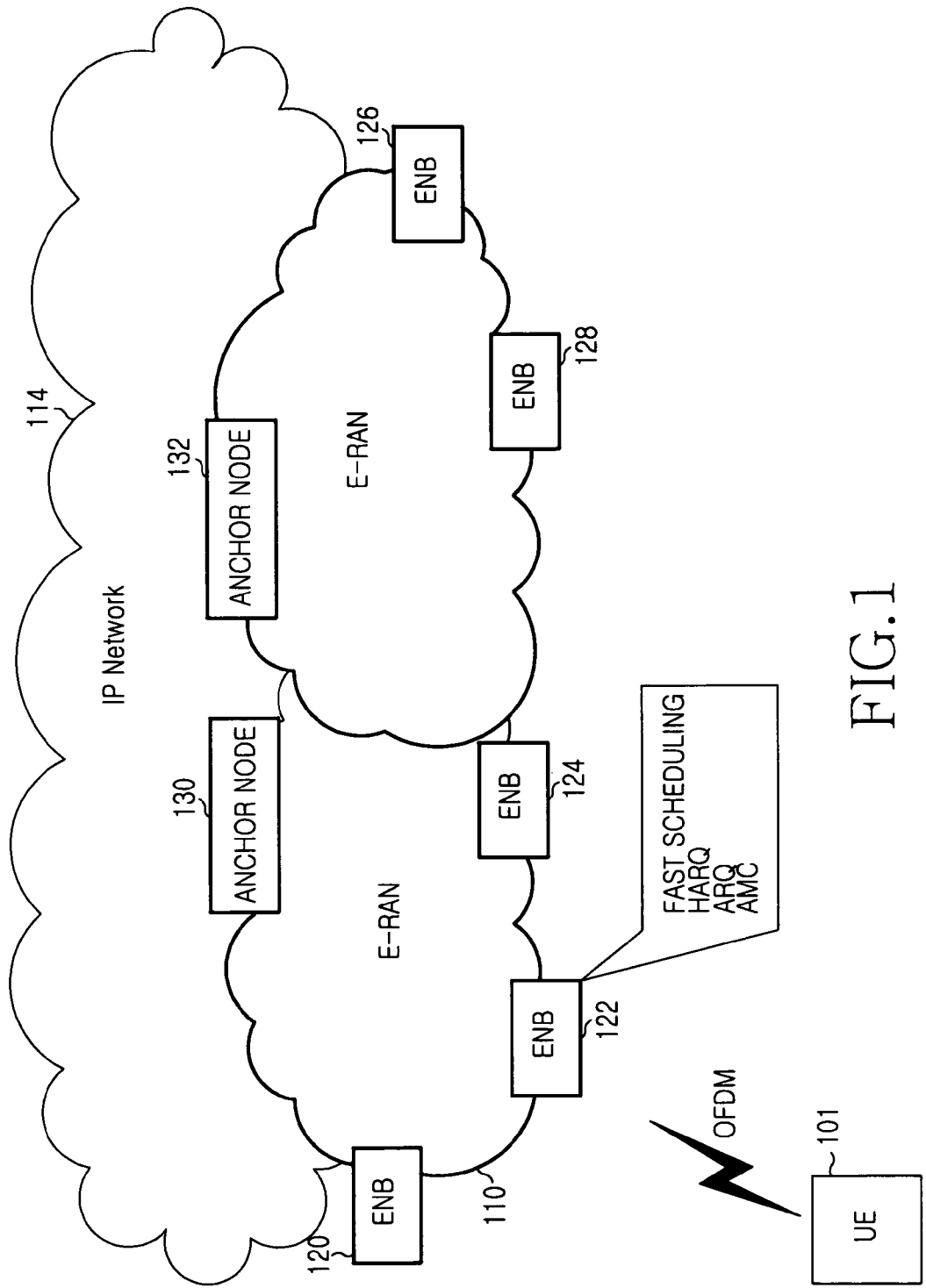
FIG. 1 illustrates a 3GPP LTE system structure according to an exemplary embodiment of the present invention.

FIG. 1 illustrated an evolved UMTS mobile communication system (hereafter, referred to as an LTE system) according to an exemplary embodiment of the present invention.

An Evolved UMTS Terrestrial Radio Access Network (E-UTRAN) 110 in FIG. 1 is simplified into a two-node structure including evolved Nodes Bs (eNBs) 120, 122, 124, 126 and 128 and anchor nodes 130 and 132. A User Equipment (UE) or a terminal 101 accesses an Internet Protocol (IP) network over the E-UTRAN 110. The eNBs 120 through 128 correspond to the existing Node B of the UMTS system and are connected to the UE 101 via radio channels. Unlike the existing node B, the eNBs 120 through 128 perform more complicated functions. Since real-time services, such as Voice over IP (VoIP) and user traffic using an IP are serviced in the shared channel in the LTE, a device for aggregating and scheduling status information of the UEs is required, which is undertaken by the eNBs 120 through 128. Mostly, one eNB controls a plurality of cells. To implement the transfer rate of 100 Mbps at maximum, it is expected that the LTE will adopt Orthogonal Frequency Division Multiplexing (OFDM) as the RAT in the 20 MHz bandwidth.

Figure 2:
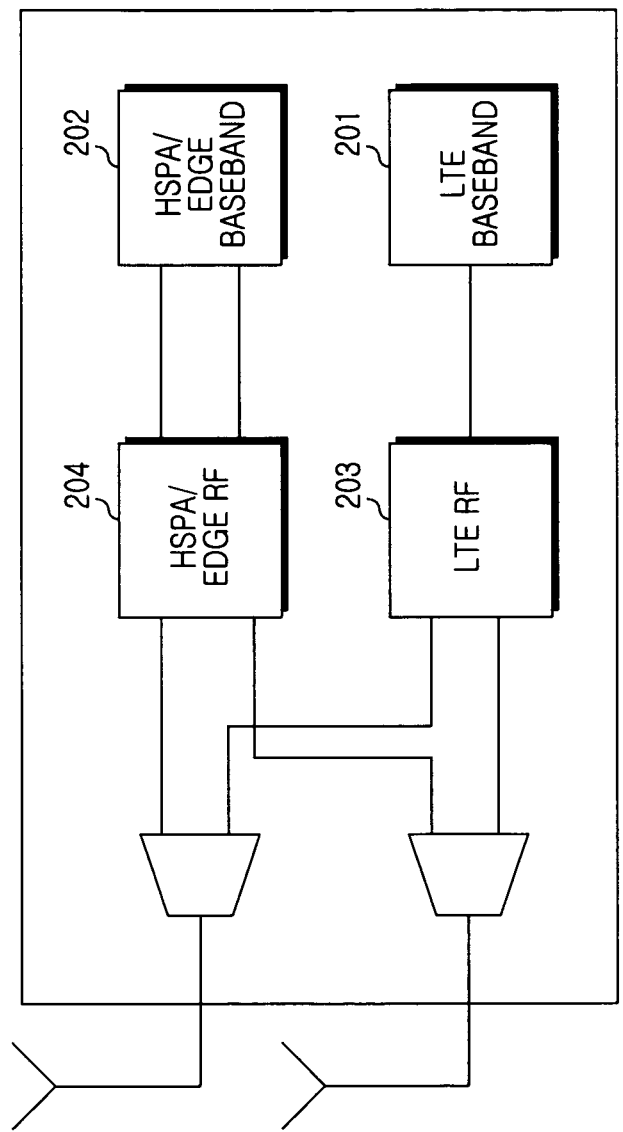
FIG. 2 illustrates a multimode terminal structure according to an exemplary embodiment of the present invention.

FIG. 2 illustrates a multimode terminal structure according to an exemplary embodiment of the present invention.

The LTE terminal can be implemented in various modes such as LTE only mode, LTE/EDGE dual mode, LTE/HSPA/EDGE triple mode, LTE/HRPD dual mode, and LTE/HRPD/EDGE triple mode. Herein, the structure of the terminal supporting the LTE/HSPA/EDGE triple mode is shown as the mere example of the multimode terminal in FIG. 2. As aforementioned, the multimode terminal can be realized in various modes.

The multimode terminal of FIG. 2 includes an LTE baseband chipset 201, a HSPA/EDGE dual mode baseband chipset 202, an LTE Radio Frequency (RF) chipset 203, and a HSPA/EDGE dual mode RF chipset 204.

Specific procedures based on the structure of FIG. 2 are now described.

To measure a signal of the EDGE in the operations of the LTE system, the LTE baseband chipset 201 calculates an offset between reference times of the two systems using a time latch interface, calculates a sync signal location of the EDGE network based on the reference time of the EDGE system using the offset, and informs the HSPA/EDGE dual mode baseband chipset 202 of the sync signal location through Inter-Processor Communication (IPC). The HSPA/EDGE dual mode baseband chipset 202 performs the required measurement by turning on the HSPA/EDGE dual mode RF chipset 204 at an appropriate time and informs the LTE baseband chipset 201 of the measurement result.

Next, to measure a signal of the HSPA in the operations of the LTE system, the LTE baseband chipset 201 generates a trigger signal to the HSPA/EDGE dual mode baseband chipset 202 at a time point previously agreed before the GAP interval. The HSPA/EDGE dual mode baseband chipset 202 measures the HSPA signal over the GAP interval according to the trigger signal and notifies the LTE baseband chipset 201 of the measurement result.

To measure a signal of the LTE in the operations of the EDGE system, at an agreed point before an idle frame start point of the EDGE system and a GAP interval start point of the HSPA system, the HSPA/EDGE dual mode baseband chipset 202 generates a trigger signal to the LTE baseband chipset 201. The LTE baseband chipset 201 measures the LTE signal over the GAP interval according to the trigger signal and reports the measurement result to the HSPA/EDGE dual mode baseband chipset 202.

Besides the above-stated procedures, to measure the EDGE signal, a method for driving the reference time of the EDGE system and acquiring the time offset by use of the trigger signal, rather than the time latch signal, may be applied. To measure the LTE and HSPA signals, the time offset is calculated using the time latch signal and then the GAP location is determined based on the reference time of the corresponding system. Apparently, the time latch scheme and the triggering scheme are not limited to a particular measurement mode but applicable to any measurement mode.

Figure 3:
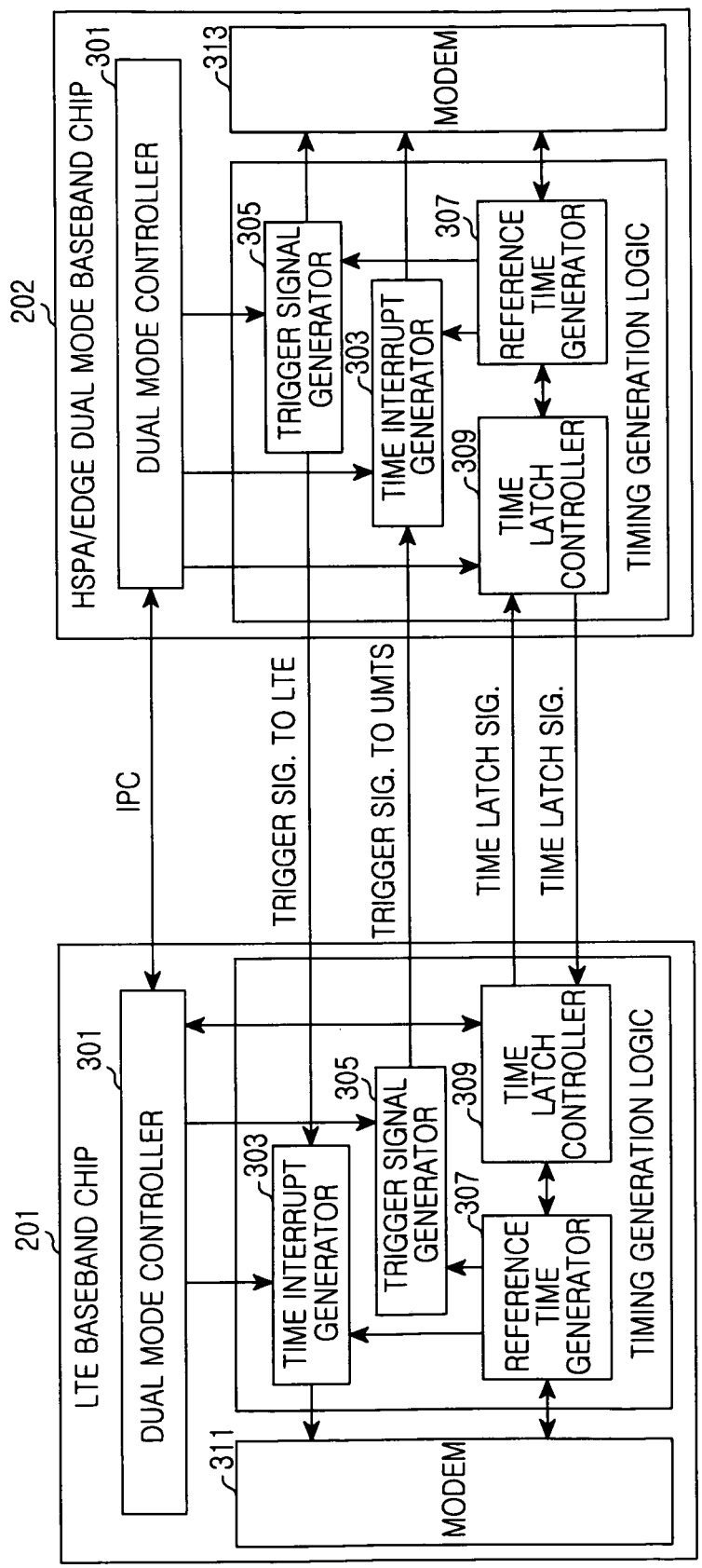
FIG. 3 illustrates interface between an LTE baseband chip and a HEDGE baseband chip and block components in the chips for inter-RAT measurement according to an exemplary embodiment of the present invention.

FIG. 3 illustrates the detailed structures of the LTE baseband chipset 201 and the HSPA/EDGE dual mode baseband chipset 202 of FIG. 2.

As shown in FIG. 3, the LTE baseband chipset 201 and the HSPA/EDGE dual mode baseband (also referred to as a HEDGE baseband) chipset 202 include a similar construction and perform the similar functions. However, the modems 311 and 313 of the baseband chipsets 201 and 202 function differently. The modem 311 of the LTE baseband chipset 201 processes signals transmitted and receives according to the LTE RAT. The modem 313 of the HEDGE baseband chipset 202 processes signals transmitted and received according to the HSPA or EDGE RAT. The following explanations focus on the operations for the inter-RAT measurement.

In FIG. 3, the interface between the two baseband chipsets supports both of the triggering scheme and the time latch scheme. When only scheme is supported, some components in FIG. 3 may be removed. For example, when only the triggering scheme is supported, a time latch controller 309 and a corresponding interface line can be eliminated.

A Dual Mode Controller (DMC) 301 controls the state and the inter-RAT measurement of the terminal. The interface signal according to the present invention includes two types; that is, the trigger signal and the time latch signal.

When a trigger command is given from the DMC 301, a trigger signal generator 305 generates the trigger signal to the other baseband chipset at the pointed time based on the time of a Reference Time Generator (RTG) 307. Next, a time interrupt generator 303 of the correspondent baseband chipset drives the modem by generating the time interrupt required for the measurement using the trigger signal.

When a time latch command is given from the DMC 301, a time latch controller 309 generates the time latch signal to the other baseband chipset at the pointed time based on the time of the RTG 307. The time latch controller 309 of the other baseband chipset latches and reports the time of the RTG 309 of the time latch signal reception time to the DMC 301. The DMC 301 informs the DMC of the other baseband chipset of the reported time through the IPC. As such, the DMC 301 of the baseband chipset in process may acquire the reference time of the other baseband chipset using the time latch scheme.

Figure 4:
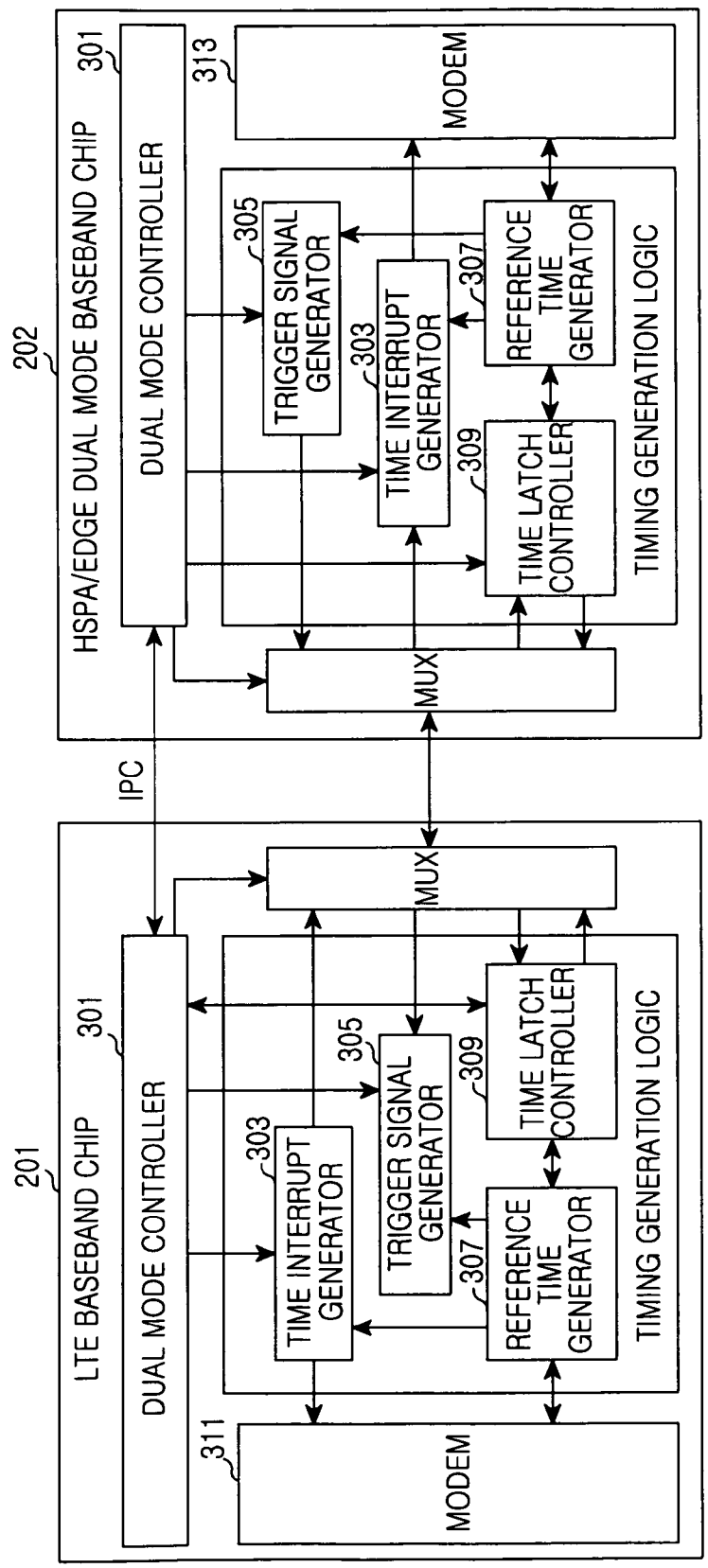
FIG. 4 illustrates interface between an LTE baseband chip and a HEDGE baseband chip and block components in the chips for inter-RAT measurement according to another exemplary embodiment of the present invention.

Alternatively, the interface between the two baseband chipsets 201 and 202 may be multiplexed and processed. In FIG. 4, a single interface line to the outside of the baseband chip is provided by multiplexing the external interface of FIG. 3. The necessary signal may be selected and used through the external interface MUX of the input/output capabilities as shown in FIG. 4.

Referring back to FIG. 2, when the two systems utilize the different RF chipsets, it is necessary to turn on the RF chipset in advance before the GAP starts and to lock a Phase Locked Loop (PLL). Hereafter, exemplary embodiments of the present invention basically assume that different RF chipsets are used. When a common RF chipset is used, the RF transition time can be adjusted and all other procedures are the same in the following embodiments of the present invention.

Figure 5:
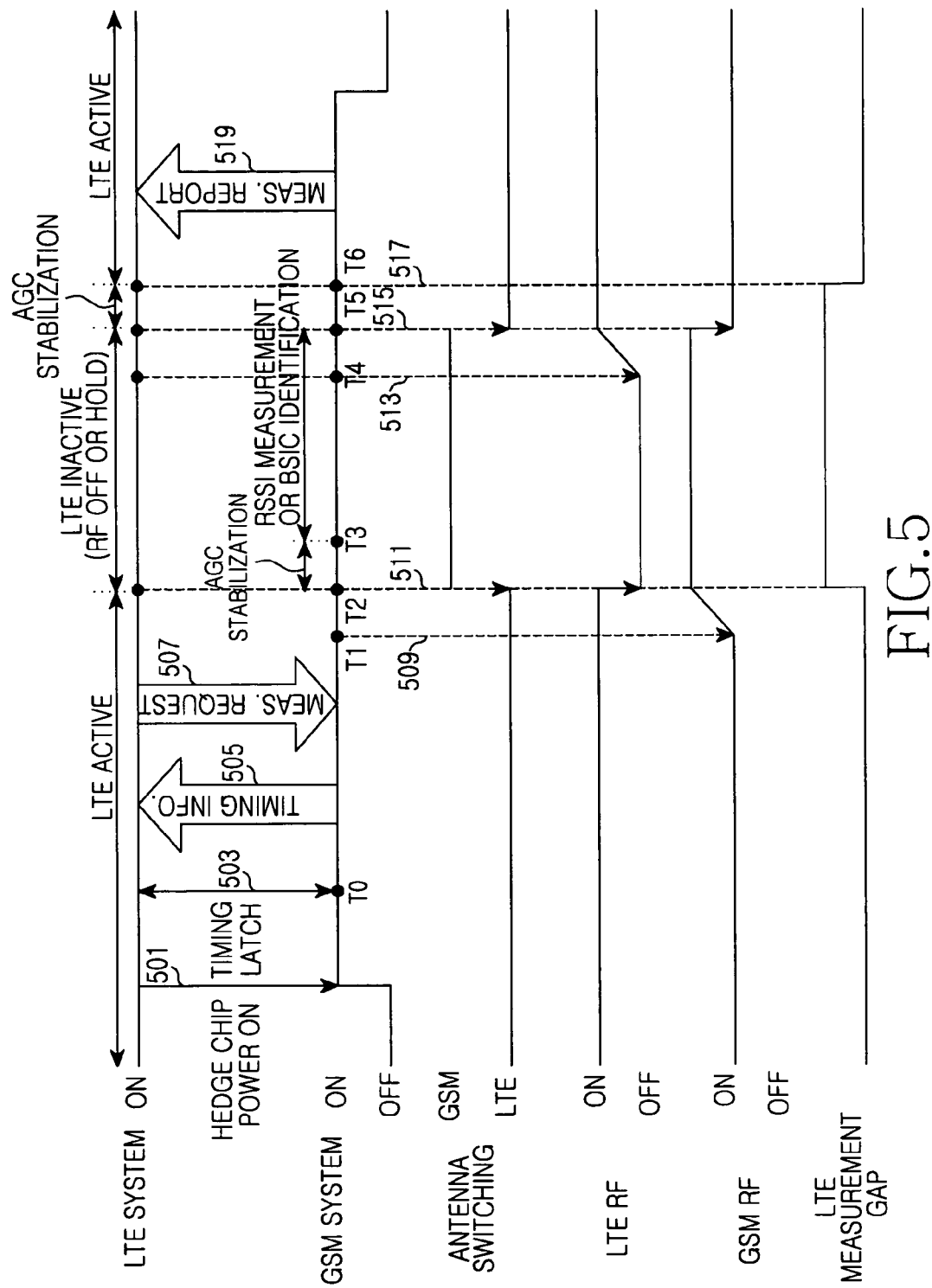
FIG. 5 illustrates the timings of RSSI measurement and BSIC identification of GSM carrier in an LTE operation mode according to an exemplary embodiment of the present invention.

FIG. 5 illustrates the timing when the GSM signal is measured in the LTE operations according to an exemplary embodiment of the present invention. In particular, FIG. 5 shows the procedure using the time latch among the GSM signal measurement methods in the process of the LTE system (the baseband chipset and the RF chipset) operations.

The GSM measurement is divided into (1) RSSI measurement, (2) BSIC identification, and (3) BSIC re-confirmation. Herein, the Received Signal Strength Indication (RSSI) measurement measures the RSSI of the cell and does not require separate GSM timing information. The Base Station Identification Code (BSIC) identification acquires BSIC information by receiving a sync channel of the GSM cell and also requires no GSM timing information. To measure the signal in the GAP interval, it is necessary to know the start point and the length of the GAP interval. The BSIC re-confirmation confirms the BSIC by periodically re-demodulating the sync channel with respect to the GSM carrier of the received sync channel since the sync channel is already known through the BSIC identification. To do so, location information (timing information) of the existing sync channel received is utilized.

Now referring to FIG. 5, when the measurement condition through the GAP is satisfied, the LTE system turns on the HEDGE chipset in step 501. In some embodiments, the measurement condition is checked in the LTE protocol stack. When the condition is satisfied, this is informed to the DMC. Thus, the DMC can take charge of the actual HEDGE chip control.

The LTE system generates the time latch signal to the GSM system (the HEDGE chip) at the time T0 and the GSM system performs the time latch operation in step 503. The GSM latches the time of the RTG 307 of the time point receiving the time latch signal and reports the latched time to the DMC.

The GSM system reports the time latch result to the LTE system through the IPC in step 505. The time latch result indicates the GSM Time Control Unit (TCU) value (the value of the RTG) at the time T0.

The LTE system calculates a time difference of the time T0 and the time T2 and a time difference of the time T0 and the time T5, and sends a measurement request message to the GSM system before good time from the GAP start point in step 507. Herein, the measurement request message includes measurement parameter information required for the basic measurement, and the timing offset information of T2 and T5 based on T0; that is, (T2-T0) value and (T5-T0) value. Alternatively, instead of the offset information, the time T2 and the time T0 of the GSM system can be informed directly. That is, the LTE system informs the GSM system of the GAP timing. Next, the GSM system sets T1, T2 and T5 values by controlling the time interrupt generator based on the information received from the LTE system.

The GSM system turns on the RF processor (module or chipset) at the time T1 and sets the PLL in step 509.

In step 511, the GSM system switches the antenna at the time T2 and turns on the modem. In so doing, the LTE system turns off or holds the RF module according to the length of the GAP.

After turning on the modem, the GSM system measures the RSSI using the signal received from a neighbor GSM base station or commences the BSIC identification by receiving the sync channel at the time T3. Since the RSSI measurement needs to be conducted on the multiple carriers, the GSM RF band can be changed several times within the GAP interval, which is not illustrated in the drawing.

The LTE system turns on the RF module and sets the PLL at the time T4 in step 513. If the RF module of the LTE system is held, no action is performed at the time T4.

In step 515, the LTE system switches the antenna at the time T5 and turns on the modem. Simultaneously, the GSM system turns off the RF module. Since the GSM system basically enables the offline operation, it can carry out the modem operation for processing the stored receive signal even when the RF module is turned off after the time T5.

After completing the operation according to the GAP, the LTE system commences the normal operation at the time T6 in step 517.

Meantime, when completing the measurement on the received signal in the GAP interval, the GSM system reports the measurement result to the LTE system in step 519. At this time, in the RSSI measurement, the LTE system can report of the RSSI value of each carrier. In the BSIC identification, the LTE system can report the decoding result of the sync channel and the sync channel timing.

As above, after the inter-RAT measurement process is finished, when a good time is left until the next GAP, the HEDGE chipset is turned off.

Two RF chipsets and one common antenna have been described in FIG. 5. When the common RF chipset is employed, the time T1 of transiting to the GSM carrier can be performed at the time T2.

Figure 6:
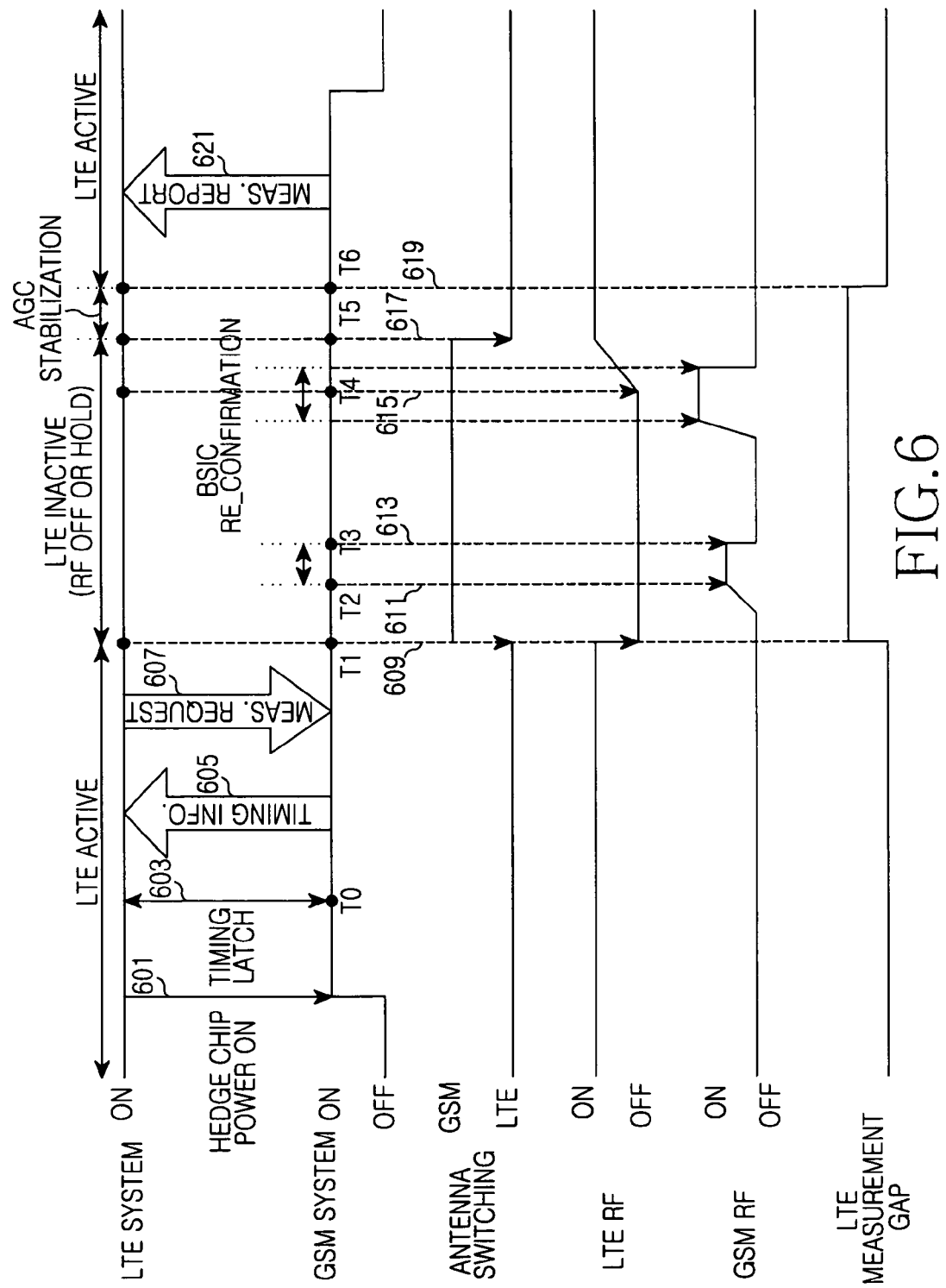
FIG. 6 illustrates the timing of BSIC re-confirmation of the GSM carrier in the LTE operation mode according to an exemplary embodiment of the present invention.

FIG. 6 illustrates the timing for the BSIC re-confirmation in the LTE operation according to an exemplary embodiment of the present invention.

When the measurement condition through the GAP is satisfied, the LTE system powers up the HEDGE chipset in step 601. In the actual implementation, the measurement condition is checked in the LTE protocol stack. When the condition is satisfied, this is informed to the DMC. Thus, the DMC can take charge of the actual HEDGE chip control.

The LTE system generates the time latch signal to the GSM system (the HEDGE chip) at the time T0 and the GSM system performs the time latch operation in step 603. The GSM latches the time of the RTG of the time point receiving the time latch signal and reports the latched time to the DMC. The GSM system reports the time latch result to the LTE system through the IPC in step 605. The time latch result indicates the GSM TCU value (the value of the RTG) at the time T0.

Next, the LTE system checks the GSM sync channel decodable in the GAP interval. When the decoding time including the RF transition time does not overlap, one or more sync channels can be decoded in the GAP interval. Hence, the LTE system sends the measurement request message including the one or more sync channel information to decode and the timing information to the GSM system in step 607. In so doing, the times T1, T2, T3, . . . (when there are one or more sync channels, T2-1, T3-1), T5 can be informed.

The GSM system sets the necessary timing values by controlling the time interrupt generator based on the information received from the LTE system. In FIG. 6, it is assumed that two sync channels are decoded in the corresponding GAP interval. While the RF module is turned off at the time T3, the time for turning off and on the RF module will not be sufficient in most cases. Hence, the transition to the second RF carrier at the time T3 will be necessary. If one sync channel is decoded, the RF module can be turned off at the time T3.

After setting the necessary timing values, the GSM system switches the antenna at the time T1 in step 609. In fact, the antenna switching can be carried out at any time point between the time T1 and the time T2. Except for the duration between T2 and T3 where the GSM system decodes the sync channel, the LTE system is free to be turned on and to use the antenna. At the time T1, the LTE system turns off or holds the RF module according to the GAP length.

After the antenna switching, the GSM system turns on the RF module before the time T2 and sets the PLL. The GSM system powers up the modem at the time T2 and decodes the sync channel in step 611. Herein, the power-up timing of the RF module between the time T1 and the time T2 can vary according to the scenario of the GSM system.

When the sync channel decoding is completed at the time T3, the GSM system turns off the RF module, or transits the RF module to another carrier when there exists another sync channel to decode in step 613. Since the GSM system is basically configured as the offline operation structure, the RF off is possible before the sync channel decoding is finished.

The LTE system powers up the RF module at the time T4 and sets the PLL in step 615. If the LTE RF module is on hold, no action occurs at the time T4.

The LTE system switches the antenna at the time T5 and turns on the modem in step 617.

Next, the LTE system commences the normal operation at the time T6 in step 619.

Meantime, when the measurement based on the GAP interval is finished, the GSM system reports the measurement result to the LTE system in step 621. In case of the BSIC re-confirmation, the GSM system can report the decoding result of the sync channel and the timing information of the sync channel to the LTE system.

After the inter-RAT measurement process is completed, when there remains a good time until the next GAP, the HEDGE chipset is turned off. Among the GSM signal measurement methods in the LTE system operation, the method of FIGS. 5 and 6 utilizes the time latch.

Alternatively, the GSM measurement may be conducted using the trigger signal in the LTE system operation. More particularly, the reference clock of the GSM System can be turned on at the time desired by the LTE system using the trigger signal. The power-on time of the HEDGE chipset and the procedures other than the time latch are substantially the same as in FIGS. 5 and 6.

Now, the UMTS signal measurement method when the LTE system is in operation is described. Unlike the GSM measurement, the UMTS signal measurement can carry out the system acquisition to the measurement within the GAP interval without maintaining the timing. Accordingly, the LTE baseband chipset triggers a particular time to the HEDGE chipset using the trigger signal and informs the HEDGE baseband chipset of the start point and the length of the GAP interval based on the trigger time. Next, the HEDGE baseband chipset performs the necessary measurement over the GPA interval and reports the measurement result to the LTE baseband chipset.

Figure 7:
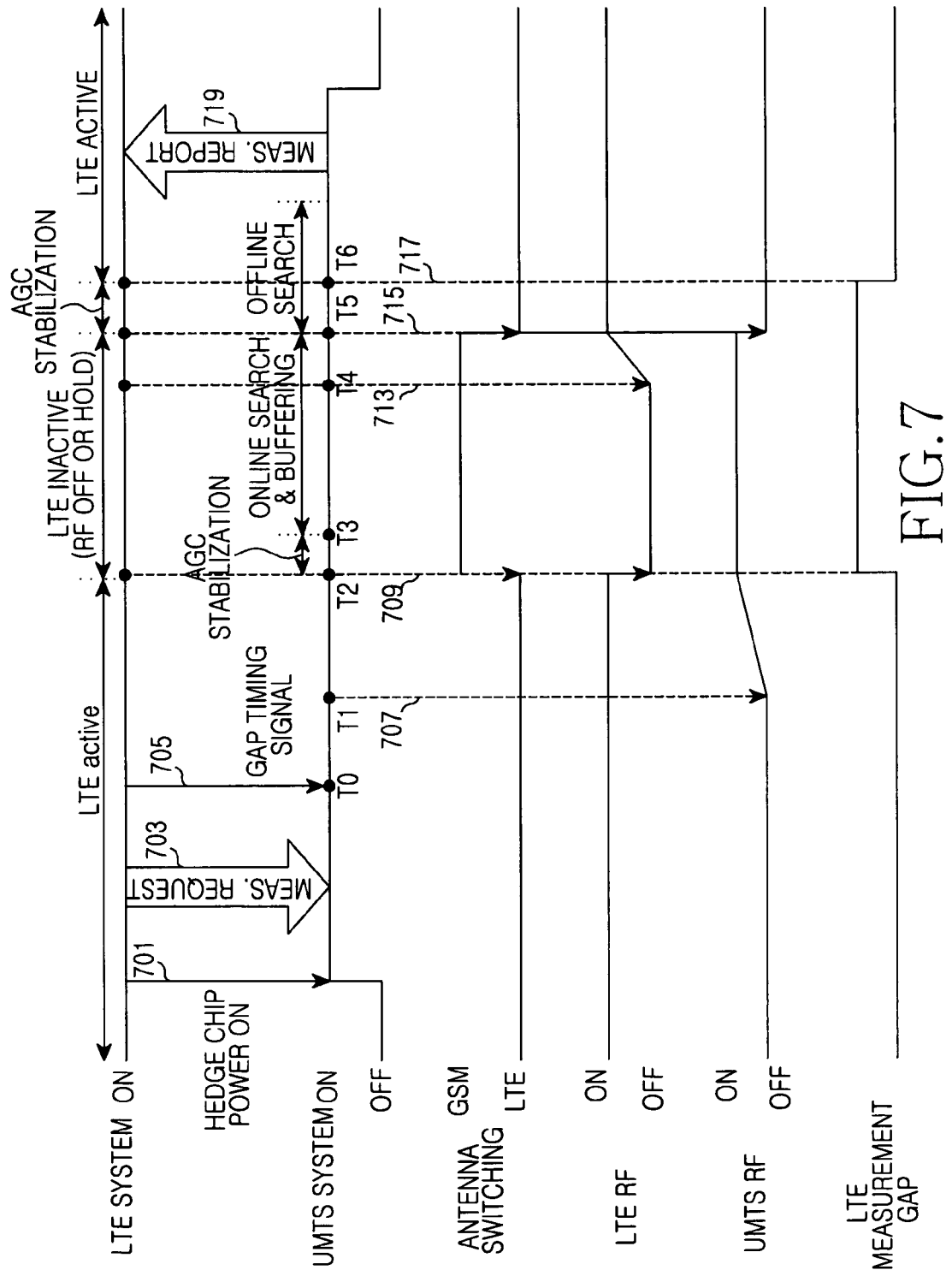
FIG. 7 illustrates the timing of the UMTS signal measurement in an active mode according to an exemplary embodiment of the present invention.

FIG. 7 illustrates the timing of the UMTS signal measurement in the LTE system operation according to an exemplary embodiment of the present invention.

When the measurement condition through the GAP is satisfied, the LTE system powers up the HEDGE chipset in step 701. In the actual implementations, the measurement condition is checked in the LTE protocol stack. When the condition is satisfied, this is informed to the DMC. Thus, the DMC can take charge of the actual HEDGE chip control.

The LTE system sends the measurement request message to the UMTS system through the IPC before the agreed time from the GAP start point in step 703. The measurement request message can include basic measurement parameter information and timing offset information of T2 and T5 based on the time T0; that is, (T2-T0) and (T5-T0) values.

Next, the LTE system generates the GAP timing signal (the trigger signal) to the HEDGE chipset (the UMTS system) before (T2-T0) from the GAP start point in step 705.

The UMTS system drives its internal RTG (the time generation block) according to the GAP timing signal. At this time, the UMTS system may process the T0 interval and the T1 interval as zero according to its measurement operation scenario and process them as the same time point. Namely, the HSPA system (the UMTS system) may turn on the RF module at the time T0. It is assumed that every parameter and every timing of the present invention can be controlled by software.

Meantime, the HSPA system turns on the RF module at the time T1 and sets the PLL to the necessary RF band in step 707. Herein, the interval between the time T1 and the time T2 should be enough for the RF stabilization.

The HSPA system switches the antenna at the time T2 and turns on the modem in step 709. In so doing, the LTE system can turn off or hold the RF module according to the GAP length.

The HSPA system commences the online search at the time T3 in step 711. The interval between the time T2 and the time T3 should be enough for AGC stabilization. As performing the step 1 in the online search, the HSPA system can buffer for the offline search. In case where both of the system acquisition and the measurement can be accomplished through the online search during the GAP interval, the buffering is unnecessary.

The LTE system turns on the RF module at the time T4 and sets the PLL in step 713. When the RF module of the LTE system is on hold, there is no action to conduct at the time T4.

In step 715, the LTE system switches the antenna at the time T5 and turns on the modem. At this time, the HSPA system turns off the RF module. When the online search and the buffering are finished before the time T5, the HSPA system can turn off the RF module and enter the power saving mode.

Meanwhile, the LTE system commences the normal operation at the time T6 in step 717.

When the measurement based on the GAP interval is completed, the HSPA system reports the measurement result to the LTE system in step 719.

As such, when the inter-RAT measurement process is completed and there remains a good time until the next GAP, the HEDGE chipset is turned off.

The UMTS signal measurement using the trigger signal in the LTE system operation has been described in FIG. 7. Alternatively, the UMTS signal may be measured using the time latch scheme. More specifically, using the time latch, by acquiring the offset between the reference times of the two systems, the LTE system can calculate the GAP start point based on the offset and inform the HSPA system of the calculated GAP start point.

Figure 8:
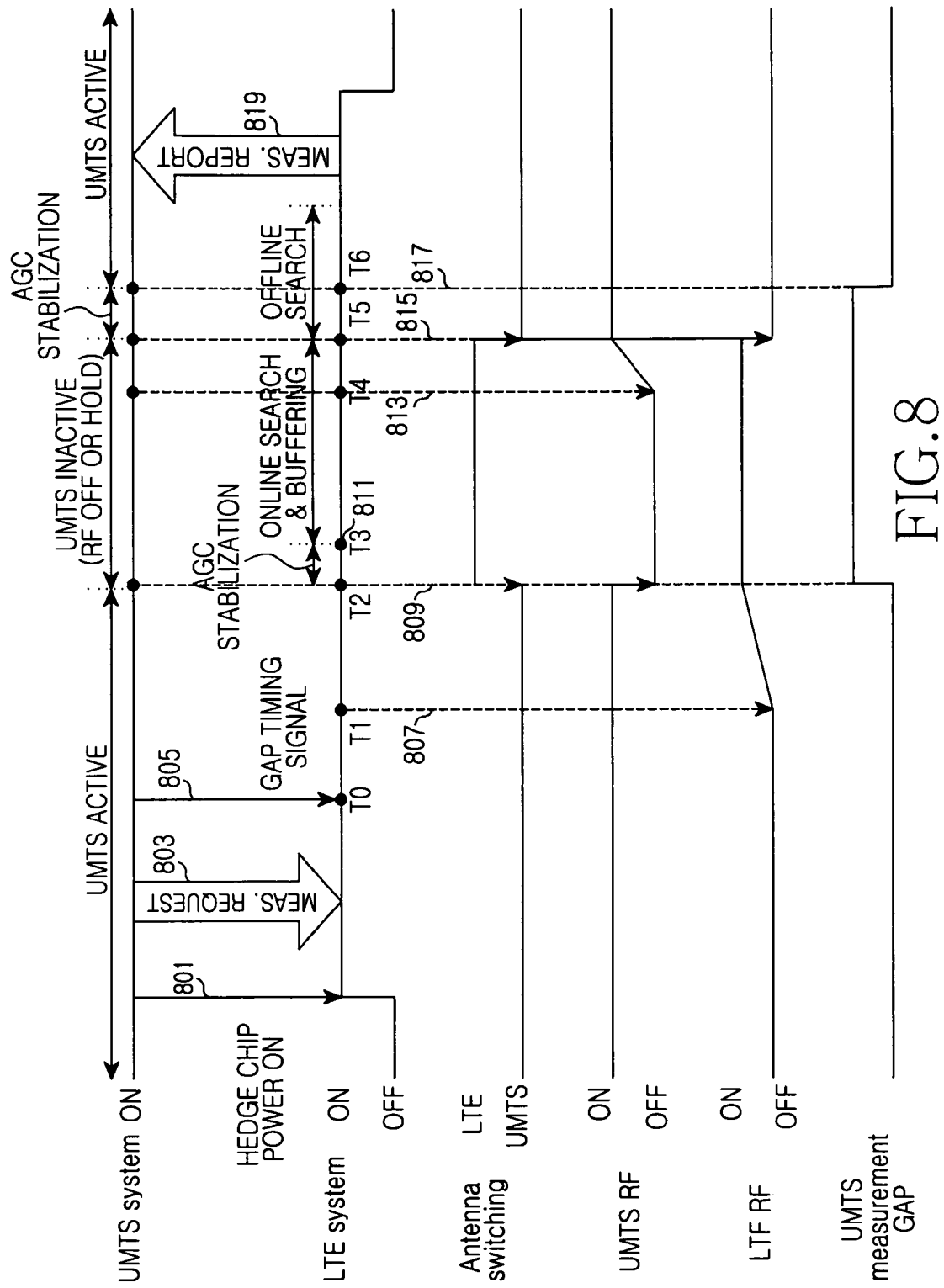
FIG. 8 illustrates the timing of the LTE signal measurement in a HSPA active mode according to an exemplary embodiment of the present invention.

FIG. 8 illustrates the timing of the LTE signal measurement when the HSPA is in operation according to an exemplary embodiment of the present invention. The scenario of FIG. 8 is the same as the scenario of FIG. 7 with the LTE system and the HSPA system exchanged. Thus, its further descriptions shall be omitted.

Other exemplary embodiments than the aforementioned embodiments of the present invention are now provided.

Among the methods for measuring the LTE signal in the HSPA system operation, the method using the triggering scheme is illustrated in FIG. 8. Alternatively, the LTE signal may be measured using the time latch scheme in the HSPA system operation.

Alternatively, the LTE signal can be measured using the time latch scheme in the EDGE system operation.

Alternatively, the LTE signal can be measured using the triggering scheme in the EDGE system operation.

The triggering scheme can be applied to the handover. For instance, in the handovers from LTE to EDGE, from LTE to HSPA, from EDGE to LTE, and from HSPA to LTE, when the handover command is given, the handover can be accomplished at the accurate time by informing of the RF switching time from the serving system to the target system using the trigger signal.

Alternatively, at the dual mode terminal employing the LTE baseband chipset and the EDGE baseband chipset, the inter-RAT measurement and the handover can be carried out using the triggering scheme and the time latch scheme.

It should be appreciated that the triggering scheme and the time latch scheme can be applied to other multimode terminal than the aforementioned examples.

Figure 9:
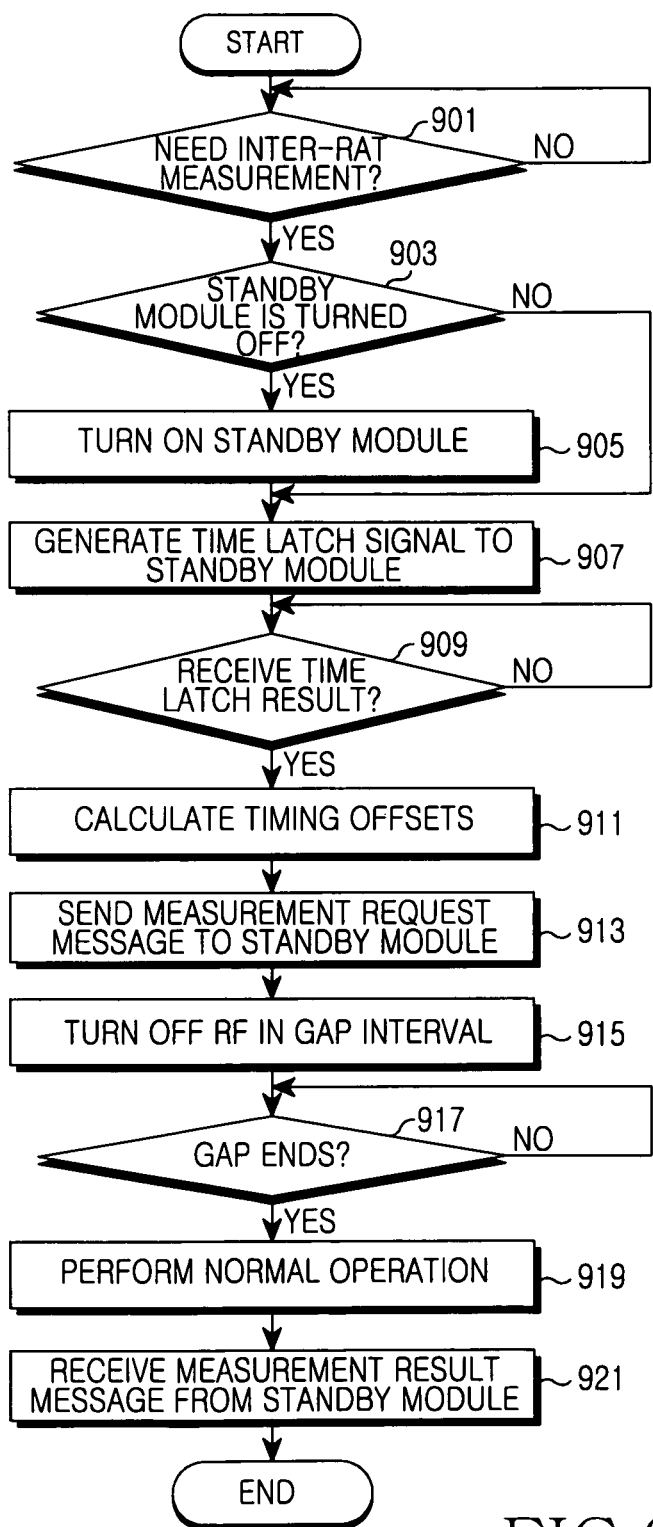
FIG. 9 illustrates operations of an operating module when the multimode terminal performs the inter-RAT measurement using a time latch scheme according to an exemplary embodiment of the present invention.

FIG. 9 illustrates operations of a currently operating module (referred to as an operating module) when the multimode terminal performs the inter-RAT measurement using the time latch scheme according to an exemplary embodiment of the present invention.

In step 901, the operating module examines whether the inter-RAT measurement is required. When the inter-RAT measurement is necessary, the operating module checks whether the standby module (the communication module in the power saving mode) is turned off in step 903. When the standby module is in the power-off state, the operating module turns on the standby module in step 905.

In step 907, the operating module generates the time latch signal to the standby module at the time T0. In step 909, the operating module determines whether the time latch result is received from the standby module. Herein, the time latch result indicates the reference time value of the standby module at the time T0.

Upon receiving the time latch result, the operating module calculates the timing offset according to the measurement interval (the GAP interval) in step 911. Referring back to FIG. 5, the operating module calculates the time difference between the time T0 and the time T2 and the time difference between the time T0 and the time T5. Herein, the time T2 and the time T5 are the antenna switching times. That is, the antenna is switched from the operating module to the standby module at the time T2 and from the standby module to the operating module at the time T5.

In step 913, the operating module sends the measurement request message including the basic measurement parameter information and the timing offset information to the standby module. Next, the operating module turns off the RF during the RF interval and terminates the communication in step 915.

In step 917, the operating module checks whether the GAP interval ends. When the GAP interval ends, the operating module performs the normal operation by turning on the RF in step 919. Herein, the RF is turned on before the GAP interval end time (the time T4) by taking into account the stabilization time.

After finishing the inter-RAT measurement, the operating module receives the measurement result message including the inter-RAT measurement result from the standby module in step 921. Depending on the measured system, the measurement result message can include at least one of the RSSI information, the timing information of a particular channel (such as the sync channel), and the demodulation result (such as BS ID) of the particular channel.

Figure 10:
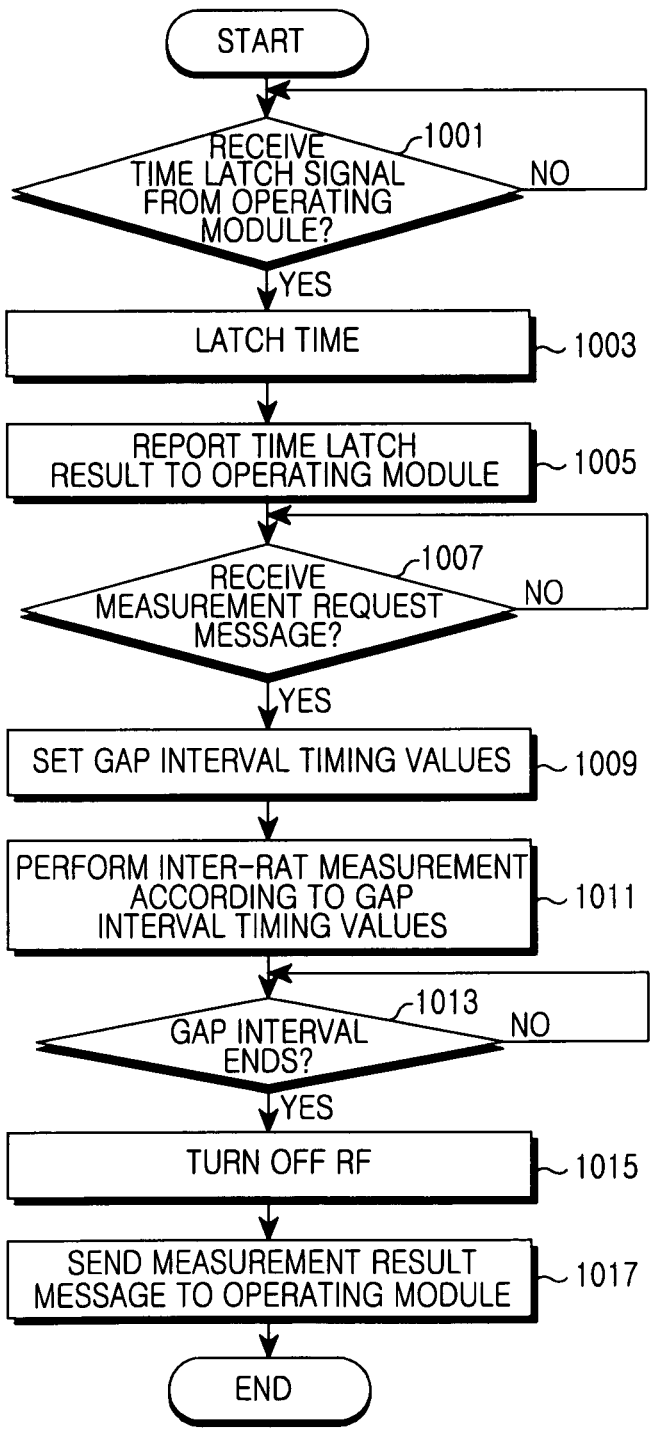
FIG. 10 illustrates operations of a standby module when the multimode terminal performs the inter-RAT measurement using the time latch scheme according to an exemplary embodiment of the present invention.

FIG. 10 illustrates operations of a module currently on standby (also referred to as a standby module) when the multimode terminal performs the inter-RAT measurement based on the time latch scheme according to an exemplary embodiment of the present invention.

In step 1001, the standby module determines whether the time latch signal is received from the operating module. Upon receiving the time latch signal, the standby module latches the time (or the reference time) of the time latch signal reception in step 1003. In step 1005, the standby module sends the time latch result message including the latched time to the operating module.

In step 1007, the standby module determines whether the measurement request message is received from the operating module. Herein, the measurement request message includes the basic measurement parameter information and the timing offset information. The time offset information includes the time difference between the time T0 and the time T2 and the time difference between the time T0 and the time T5. The time T2 and the time T5 are the antenna switching times. That is, the antenna is switched from the operating module to the standby module at the time T2 and from the standby module to the operating module at the time T5.

Meanwhile, the standby module sets the timing values (the time interrupt values) according to the measurement interval (the GAP interval) using the timing offset information of the measurement request message in step 1009. The standby module can set the time T1 through the time T6 as shown in FIG. 5.

In step 1011, the standby module performs the inter-RAT measurement according to the set timing values. The standby module determines whether the GAP interval ends in step 1013. When the GAP interval ends, the standby module turns off the RF in step 1015. When the offline measurement is possible, the standby module can continue the measurement using the receive signals stored during the GAP interval.

After finishing the measurement, the standby module sends the measurement result message including the measurement result to the operating module in step 1017. Depending on the measured system, the measurement result message can include at least one of the RSSI information, the timing information of a particular channel (such as the sync channel), and the demodulation result (such as the BS ID) of the particular channel.

Figure 11:
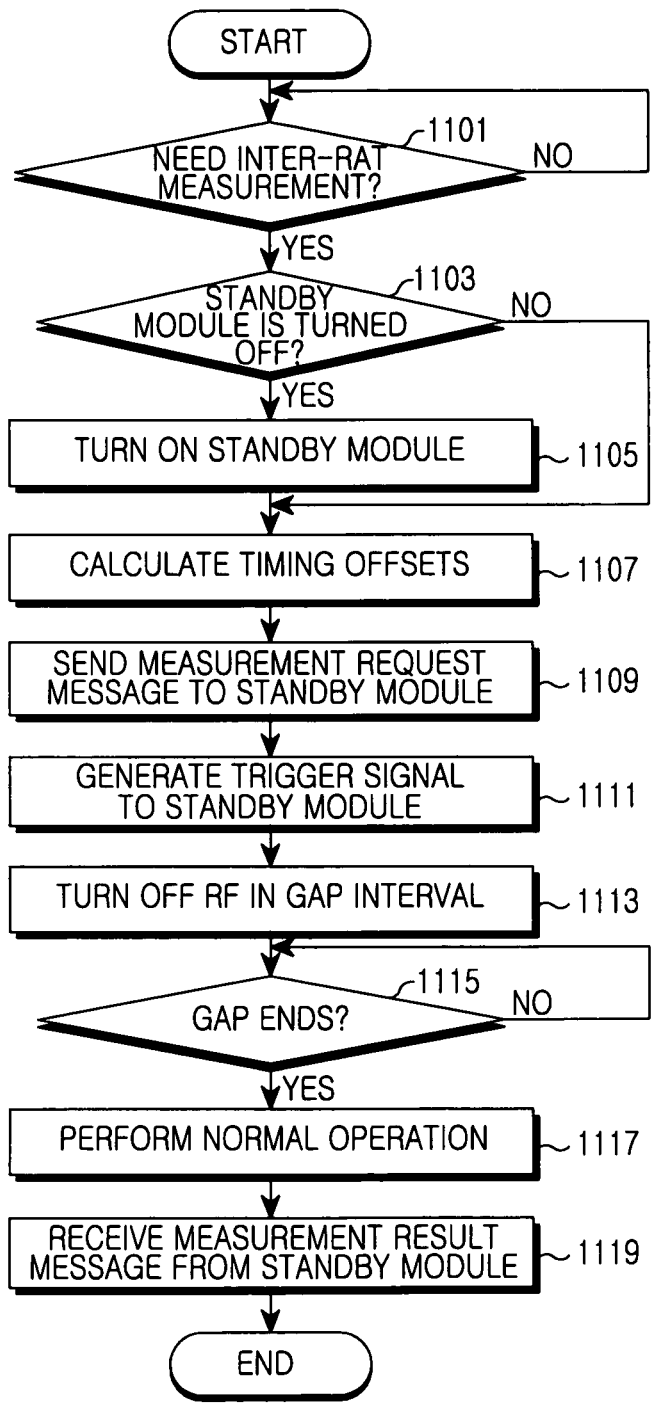
FIG. 11 illustrates operations of the operating module when the multimode terminal performs the inter-RAT measurement using a triggering scheme according to an exemplary embodiment of the present invention.

FIG. 11 illustrates operations of a module currently in operation (also referred to as an operating module) when the multimode terminal performs the inter-RAT measurement based on the triggering scheme according to an exemplary embodiment of the present invention.

In step 1101, the operating module examines whether the inter-RAT measurement is required. When the inter-RAT measurement is needed, the operating module checks whether the standby module (the communication module in the power saving mode) is in the power-off state in step 1103. When the standby module is in the power-off state, the operating module turns on the standby module in step 1105.

In step 1107, the operating module calculates the timing offset of the antenna switching times T2 and T5 based on the trigger generation time (the time T0). The antenna is switched from the operating module to the standby module at the time T2 and from the standby module to the operating module at the time T5.

In step 1109, the operating module sends the measurement request message including the basic measurement parameter information and the timing offset information to the standby module. In step 111, the operating module generates the trigger signal to the standby module at the time T0. In step 1113, the operating module turns off the RF during the measurement interval (the GAP interval) and terminates the communication. The RF off time is the time T2.

In step 1115, the operating module checks whether the GAP interval ends. When the GAP interval ends, the operating module performs the normal operation by turning on the RF in step 1117. Herein, the RF is turned on before the GAP interval end time (the time T4) by taking into account the stabilization time.

After finishing the inter-RAT measurement, the operating module receives the measurement result message including the inter-RAT measurement result from the standby module in step 1119. Depending on the measured system, the measurement result message can include at least one of the RSSI information, the timing information of a particular channel (such as the sync channel), and the demodulation result (such as the BS ID) of the particular channel.

Figure 12:
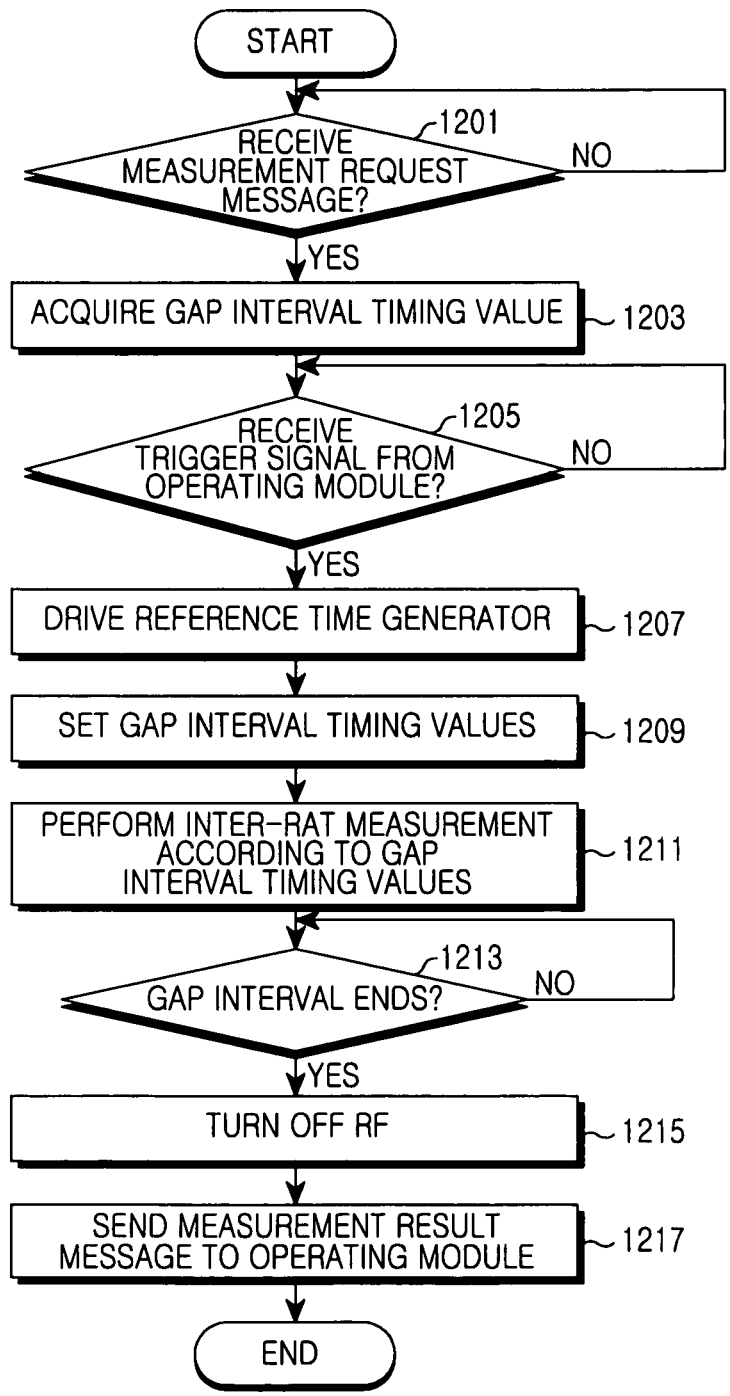
FIG. 12 illustrates operations of the standby module when the multimode terminal performs the inter-RAT measurement using the triggering scheme according to an exemplary embodiment of the present invention.

FIG. 12 illustrates operations of a module currently on standby (hereafter, referred to as a standby module) when the multimode terminal performs the inter-RAT measurement based on the triggering scheme according to an exemplary embodiment of the present invention.

In step 1201, the standby module examines whether the measurement request message is received from the operating module. The measurement request message includes the basic measurement parameter information and the timing offset information. The timing offset information is the timing offset values of the antenna switching times T2 and T5 based on the trigger generation time (the time T0). The antenna is switched from the operating module to the standby module at the time T2 and from the standby module to the operating module at the time T5. Upon receiving the measurement request message, the standby module acquires the timing values based on the measurement interval (the GAP interval) from the measurement request message in step 1203.

In step 1205, the standby module determines whether the trigger signal is received from the operating module. Receiving the trigger signal, the standby module drives the RTG in step 1207. In step 1209, the standby module sets the timing values (the time interrupt values) according to the measurement interval (the GAP interval) using the timing values obtained from the measurement request message. The standby module can set the time interrupt values T1 through T6 as shown in FIG. 7.

In step 1211, the standby module performs the inter-RAT measurement according to the set timing values. The standby module examines whether the GAP interval ends in step 1213. When the GAP interval ends, the standby module turns off the RF in step 1215. When the offline measurement is possible, the standby module can continue the measurement using the receive signals stored during the GAP interval.

After finishing the measurement, the standby module sends the measurement result message including the measurement result to the operating module in step 1217. Depending on the measured system, the measurement result message can include at least one of the RSSI information, the timing information of a particular channel (such as the sync channel), and the demodulation result (such as the BS ID) of the particular channel.

As set forth above, the multimode terminal supporting the various RATs can support the seamless handover through the inter-RAT measurement. In other words, by virtue of the interfacing for the inter-RAT measurement between the chipsets supporting the different RATs, the chipset in the power saving state can be turned on the accurate GAP time and accomplish the inter-RAT measurement.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus of a multimode terminal, the apparatus comprising:
    a first transceiver configured to communicate with a first communication network;
    a second transceiver configured to communicate with a second communication network; and
    a controller configured to:
    determine a start point and an end point based on length information of a gap for an inter-radio access technology (RAT) measurement;
    power off the first transceiver;
    send a trigger information signal to another controller to power on the second transceiver based on the start point and the end point, and to perform the inter-RAT measurement based on the second transceiver that is powered on; and
    power on the first transceiver after the inter-RAT measurement is performed,
    wherein the other controller is configured to power off the second transceiver after performing the inter-RAT measurement.

2. The apparatus of claim 1, wherein the controller is configured to power off the first transceiver and power on the second transceiver at the start point.

3. The apparatus of claim 1, wherein the controller is configured to power on the first transceiver and power off the second transceiver at the end point.

4. The apparatus of claim 1, wherein the inter-RAT measurement comprises at least one Received Signal Strength Indication (RSSI) measurement, cell identification, and cell re-confirmation.

5. The apparatus of claim 1, wherein the first communication network comprises a Long Term Evolution (LTE) network and the second communication network comprises a Global System for Mobile Communications (GSM) or a General Packet Radio Services (GPRS) network, or the first communication network comprises a GSM or GPRS network and the second communication network comprises a LTE network.

6. An apparatus of a multimode terminal, the apparatus comprising:
    a first transceiver configured to communicate with a first communication network;
    a second transceiver configured to communicate with a second communication network;
    a first controller that is powered on, the first controller configured to generate a first trigger signal for turning on a second controller, determine an interval based on a time offset between the first transceiver and the second transceiver for an inter-Radio access technology (RAT) measurement, and determine whether to power on or power off the first transceiver based on the interval while the first transceiver communicates with the first communication network; and the second controller that is powered off, the second controller configured to receive the first trigger signal from the first controller, receive an information on the determined interval from the first controller, determine whether to power on or power off the second transceiver based on the information, and perform the inter-RAT measurement, wherein the first controller maintains to power off the first transceiver during the interval and the second controller maintains to power on the second transceiver during the interval.

7. The apparatus of claim 6, wherein the first controller is configured to power on the first transceiver and the second controller s configured to power off the second transceiver after performing the inter-RAT measurement.

8. The apparatus of claim 6, wherein the first controller is configured to power off the first transceiver at a start point of the interval and the second controller is configured to power on the second transceiver prior to the start point of the interval, and the first controller is configured to power on the first transceiver prior to an end point of the interval and the second controller is configured to power off the second transceiver at the end point of the interval.

9. The apparatus of claim 6, wherein:
the first controller generates and transmits a time latch signal at a first time point to the second controller, when the second controller wakes up in response to the trigger signal,
the second controller determines a reference point based on the time latch signal and transmits the reference point to the first controller, and
the first controller determines a start point of the interval and an end point of the interval, based on the reference point.

10. The apparatus of claim 9, wherein the first controller transmits information on the start point of the interval and the end point of the interval to the second controller.

11. The apparatus of claim 9, wherein the first controller transmits the first trigger signal for turning on the second transceiver at the start point of the interval to the second controller, and transmits a second trigger signal for turning off the second transceiver at the end point of the interval to the second controller.

12. The apparatus of claim 6, wherein the second controller reports a result of the inter-RAT measurement to the first controller.

13. An operating method of a multimode terminal that supports at least two Radio Access Technologies (RATs), the method comprising:
generating, at a first controller that is powered on, a first trigger signal for turning on a second controller;
determining, at the first controller, an interval for an inter-Radio access technology (RAT) measurement while communicating with a first communication network through a first transceiver that is coupled to the first controller, the interval based on a time offset;
determining, at the first controller, whether to power on or power off the first transceiver according to the interval;
receiving, at the second controller that is powered off, the first trigger signal from the first controller;
receiving, at the second controller that is on, an information on the determined interval from the first controller;
determining, at the second controller that is on, whether to power on or power off a second transceiver that is coupled to the second controller according to the information; and
performing, at the second controller that is on, the inter-RAT measurement,
wherein the first controller maintains to power off the first transceiver during the interval and the second controller maintains to power on the second transceiver during the interval.

14. The method of claim 13, wherein the first controller is configured to power on the first transceiver and the second controller is configured to power off the second transceiver after performing the inter-RAT measurement.

15. The method of claim 13, wherein the first controller is configured to power off the first transceiver at a start point of the interval and the second controller is configured to power on the second transceiver prior to the start point of the interval, and the first controller is configured to power on the first transceiver prior to an end point of the interval and the second controller is configured to power off the second transceiver at the end point of the interval.

16. The method of claim 13, wherein:
the first controller generates and transmits a time latch signal at a first time point to the second controller, when the second controller wakes up in response to the trigger signal,
the second controller determines a reference point based on the time latch signal and transmits the reference point to the first controller, and
the first controller determines a start point of the interval and an end point of the interval based on the reference point.

17. The method of claim 16, wherein the first controller transmits information on the start point of the interval and the end point of the interval to the second controller.

18. The method of claim 16, wherein the first controller transmits the first trigger signal for turning on the second transceiver at the start point of the interval to the second controller, and transmits a second trigger signal for powering off the second transceiver at the end point of the interval to the second controller.

19. The method of claim 13, further comprising reporting, at the second controller that is on, a result of the inter-RAT measurement to the first controller.

20. The method of claim 13, wherein the second controller is powered off after maintaining to power on the second transceiver during the interval.

* * * * *